US012549571B2

(12) United States Patent
Nedbal et al.

(10) Patent No.: US 12,549,571 B2
(45) Date of Patent: *Feb. 10, 2026

(54) RESOLVING THE DISPARATE IMPACT OF SECURITY EXPLOITS TO RESOURCES WITHIN A RESOURCE GROUP

(71) Applicant: Fortinet, Inc., Sunnyvale, CA (US)

(72) Inventors: Manuel Nedbal, Santa Clara, CA (US); Ratinder Paul Singh Ahuja, Saratoga, CA (US); Sumanth Gangashanaiah, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,793

(22) Filed: Mar. 28, 2024

(65) Prior Publication Data
US 2024/0244069 A1 Jul. 18, 2024

Related U.S. Application Data

(63) Continuation of application No. 16/653,532, filed on Oct. 15, 2019, now Pat. No. 12,041,065.

(51) Int. Cl.
H04L 9/40 (2022.01)
H04L 43/0882 (2022.01)

(52) U.S. Cl.
CPC ...... H04L 63/1416 (2013.01); H04L 43/0882 (2013.01)

(58) Field of Classification Search
CPC .......... H04L 43/0882; H04L 63/104; H04L 63/1416
See application file for complete search history.

(56) References Cited

U.S. PATENT DOCUMENTS 9,467,476 B1 * 10/2016 Shieh ............... G06F 21/554
9,716,617 B1 * 7/2017 Ahuja ............... G06F 21/554
10,142,356 B2 * 11/2018 Ahuja ............... H04L 63/1416
10,148,504 B2 * 12/2018 Ahuja ............... H04L 63/20
10,158,672 B2 * 12/2018 Shieh ............... H04L 63/1408
10,212,132 B2 * 2/2019 Ahuja ............... H04L 63/1416

(Continued)

OTHER PUBLICATIONS

Notice of Allowance for U.S. Appl. No. 18/745,677 Mar. 27, 2025, 11 pages.

Primary Examiner — Sharon S Lynch
(74) Attorney, Agent, or Firm — Jaffery Watson Hamilton & DeSanctis LLP

(57) ABSTRACT

Systems, methods, and apparatuses enable one or more security microservices to resolve the disparate impact of security exploits to resources within a resource group. When a resource group is determined to be impacted by a security exploit, the one or more security microservices determines whether the members of the resource group are disparately impacted. In response, the one or more security microservices splits the resource group into an impacted resource group and a non-impacted resource group and applies exploit mitigation to the resource group members in the impacted resource group. When the one or more security microservices determine that the resource group members of the split resource group are no longer disparately impacted, the one or more security microservices combine the impacted resource group and the non-impacted resource group back into a single resource group.

18 Claims, 12 Drawing Sheets

(56) References Cited

U.S. PATENT DOCUMENTS

| | | | |
|---|---|---|---|
| 10,218,730 B2* | 2/2019 | Ahuja | H04L 63/1408 |
| 10,313,362 B2* | 6/2019 | Ahuja | G06F 21/629 |
| 10,419,469 B1* | 9/2019 | Singh | G06F 9/545 |
| 10,484,418 B2* | 11/2019 | Ahuja | H04L 63/105 |
| 10,498,601 B2* | 12/2019 | Ahuja | H04L 67/1031 |
| 10,579,407 B2* | 3/2020 | Ahuja | H04L 63/0209 |
| 10,581,884 B2* | 3/2020 | Ahuja | H04L 67/1001 |
| 10,608,991 B2* | 3/2020 | Ahuja | G06F 16/24568 |
| 10,630,710 B2* | 4/2020 | Ahuja | H04L 67/51 |
| 10,659,496 B2* | 5/2020 | Ahuja | H04L 63/1408 |
| 10,666,617 B2* | 5/2020 | Ahuja | H04L 63/0254 |
| 10,749,889 B2* | 8/2020 | Henderson | G06F 16/245 |
| 10,868,825 B1* | 12/2020 | Dominessy | H04L 43/045 |
| 10,958,519 B2* | 3/2021 | Ahuja | H04L 63/20 |
| 10,979,446 B1* | 4/2021 | Stevens | H04L 63/1433 |
| 10,986,114 B1* | 4/2021 | Singh | G06F 16/9537 |
| 11,063,823 B2* | 7/2021 | Punathil | H04L 41/0823 |
| 11,171,969 B2* | 11/2021 | Ahuja | H04L 63/1408 |
| 11,368,486 B2* | 6/2022 | Sreedhar | H04L 63/205 |
| 11,481,498 B2* | 10/2022 | Velur | G06F 21/577 |
| 11,637,849 B1* | 4/2023 | Chen | H04L 43/06 726/22 |
| 11,677,772 B1* | 6/2023 | Kapoor | G06F 16/9535 709/224 |
| 11,689,553 B1* | 6/2023 | Singh | G06F 16/9038 726/23 |
| 11,882,141 B1* | 1/2024 | Chen | G06F 9/455 |
| 12,034,750 B1* | 7/2024 | Bog | H04L 43/045 |
| 12,120,140 B2* | 10/2024 | Singh | H04L 43/06 |
| 2016/0294866 A1* | 10/2016 | Mihelich | H04L 67/1027 |
| 2017/0063933 A1* | 3/2017 | Shieh | H04L 63/0254 |
| 2017/0104756 A1* | 4/2017 | Rosenthal | H04L 63/20 |
| 2017/0359217 A1* | 12/2017 | Ahuja | G06F 21/554 |
| 2018/0034778 A1* | 2/2018 | Ahuja | G06F 16/24568 |
| 2018/0034832 A1* | 2/2018 | Ahuja | H04L 67/51 |
| 2018/0034833 A1* | 2/2018 | Ahuja | H04L 63/1408 |
| 2018/0034839 A1* | 2/2018 | Ahuja | H04L 63/1408 |
| 2018/0041598 A1* | 2/2018 | Vats | H04L 63/104 |
| 2018/0083985 A1* | 3/2018 | Ahuja | H04L 63/0227 |
| 2018/0103064 A1* | 4/2018 | Ahuja | H04L 63/20 |
| 2018/0115635 A1* | 4/2018 | Ahuja | H04L 63/0428 |
| 2018/0121221 A1* | 5/2018 | Ahuja | H04L 63/02 |
| 2018/0191680 A1* | 7/2018 | Ahuja | H04L 63/0245 |
| 2018/0288094 A1* | 10/2018 | Ahuja | H04L 63/1408 |
| 2018/0343281 A1* | 11/2018 | Ahuja | H04L 63/1425 |
| 2019/0057015 A1* | 2/2019 | Hassan | G06F 11/008 |
| 2019/0057213 A1* | 2/2019 | Hassan | H04L 67/1031 |
| 2019/0124096 A1* | 4/2019 | Ahuja | H04L 63/1408 |
| 2019/0140903 A1* | 5/2019 | Ahuja | G06F 21/554 |
| 2019/0251082 A1* | 8/2019 | Ahuja | G06F 16/90344 |
| 2019/0312900 A1* | 10/2019 | Ahuja | H04L 63/20 |
| 2019/0342323 A1* | 11/2019 | Henderson | G06F 16/285 |
| 2019/0394214 A1* | 12/2019 | Ahuja | H04L 63/1408 |
| 2020/0195503 A1* | 6/2020 | Ahuja | H04L 63/101 |
| 2020/0242254 A1* | 7/2020 | Velur | G06F 21/552 |
| 2020/0296134 A1* | 9/2020 | Sreedhar | H04L 63/20 |
| 2020/0351286 A1* | 11/2020 | Ahuja | H04L 49/70 |
| 2020/0351306 A1* | 11/2020 | Nedbal | H04L 63/20 |
| 2020/0403868 A1* | 12/2020 | Punathil | H04L 41/0823 |
| 2022/0286483 A1* | 9/2022 | Sreedhar | H04L 63/20 |
| 2024/0031390 A1* | 1/2024 | Singh | G06F 16/9537 |

* cited by examiner

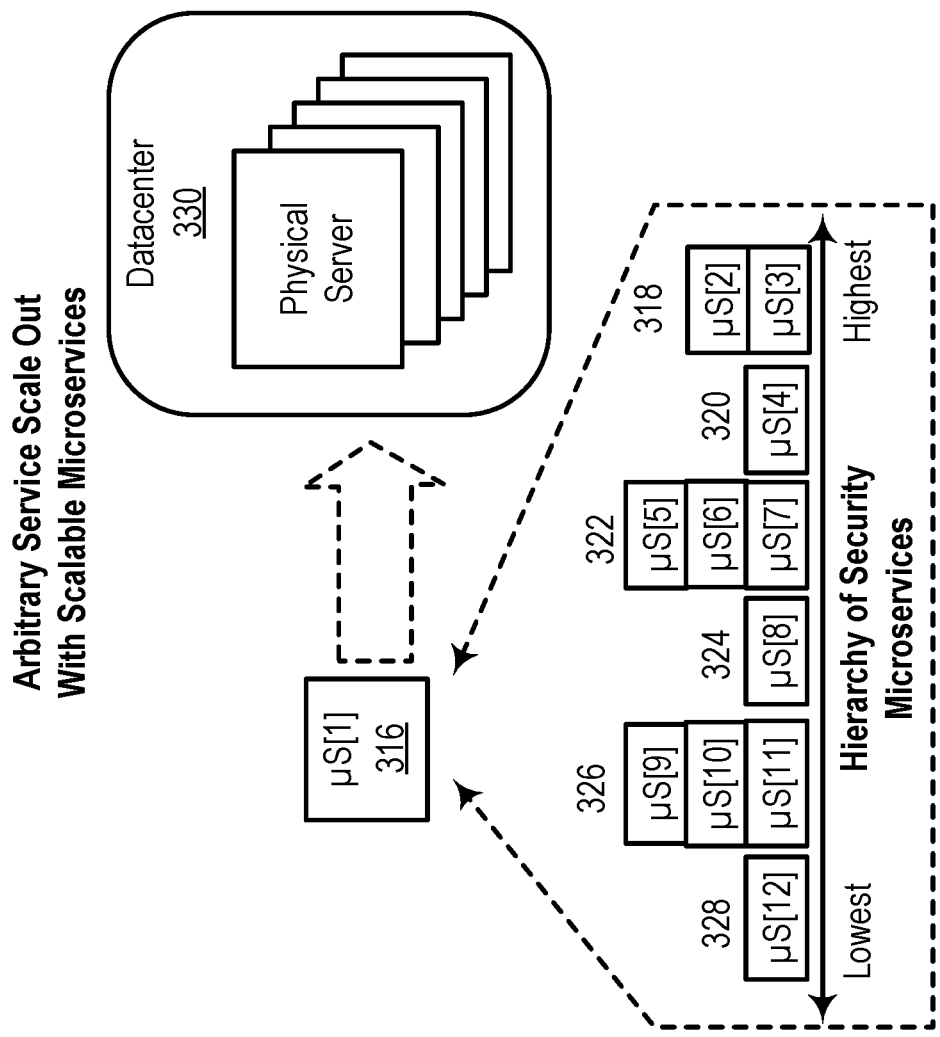
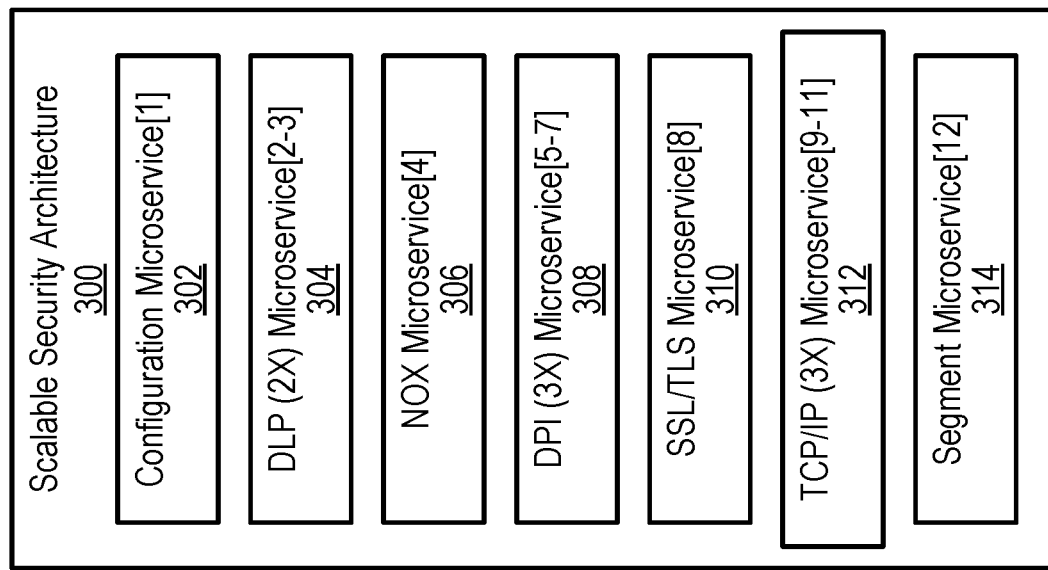
FIG. 3

RESOLVING THE DISPARATE IMPACT OF SECURITY EXPLOITS TO RESOURCES WITHIN A RESOURCE GROUP

CROSS REFERENCE TO RELATED APPLICATION

The present application is a continuation of U.S. patent application Ser. No. 16/653,532 entitled "RESOLVING THE DISPARATE IMPACT OF SECURITY EXPLOITS TO RESOURCES WITHIN A RESOURCE GROUP", and filed Oct. 15, 2019, by Nedbal et al. The entirety of the aforementioned reference is incorporated herein by reference for all purposes.

TECHNICAL FIELD

Embodiments described herein generally relate to network security. Embodiments described herein generally relate to systems and methods for resolving a disparate impact to resources within a resource group.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

FIG. 3 illustrates an arbitrary scaling out of a microservice in accordance with the disclosed embodiments;

DETAILED DESCRIPTION

Figure 1:
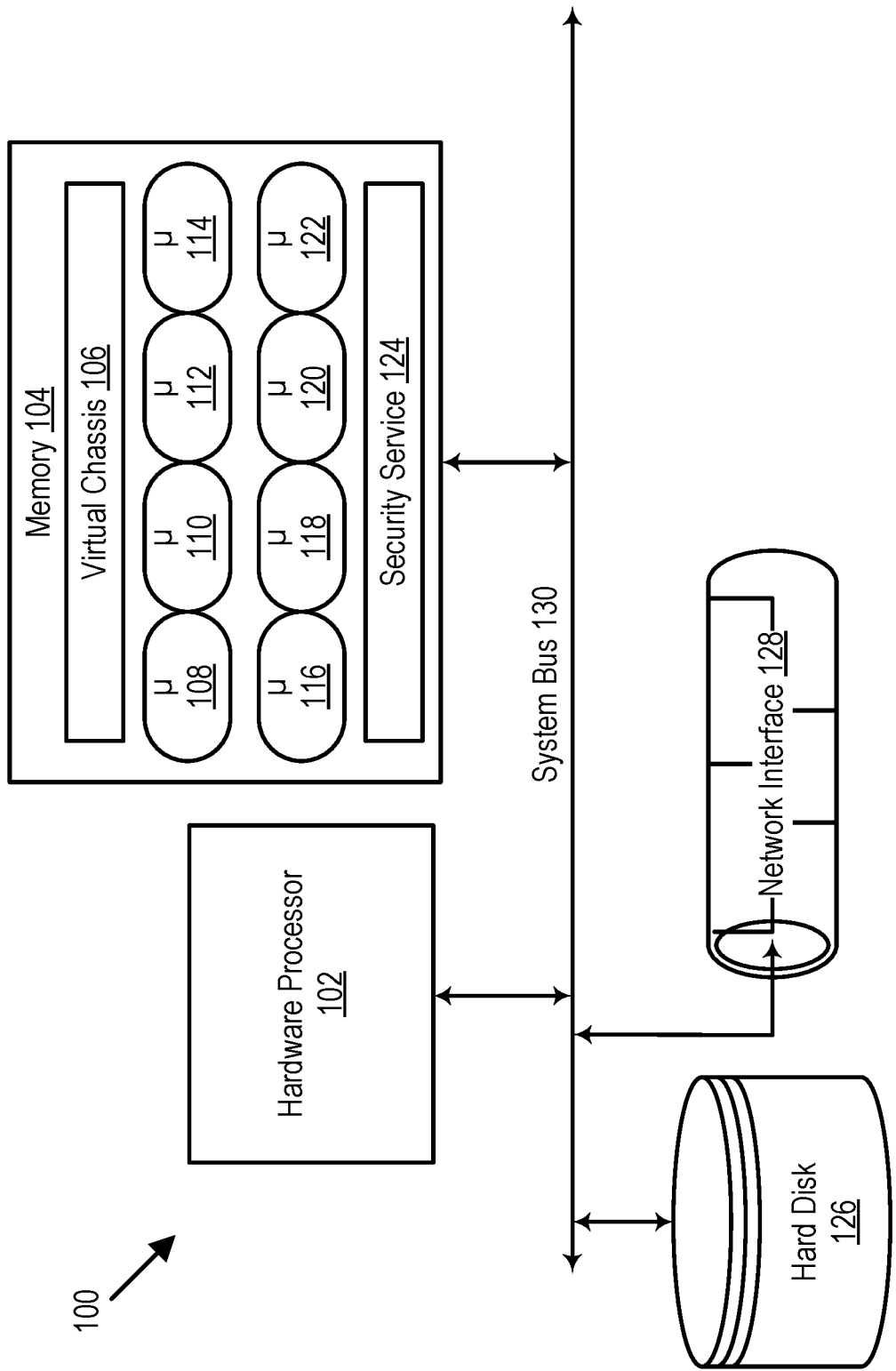
FIG. 1 is a block diagram of a network security system illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Hardware and software components of a computing environment can be referred to as resources. Examples of resources can include virtual machines, web servers, data servers, application servers, storage servers, etc. Resources can be grouped together into resource groups, for example, because the resources are performing the same functions, running the same or similar applications, and/or should be treated as a group for the purposes of security policy and enforcement. Resource group information for resource group members can be stored in data structures, where the stored information can include resource identifiers, version identifiers, associations, policies and permissions associated with each resource group member, etc. As an example, all database servers can be assigned to a resource group with certain security policies regarding the data that may be accessed or the locations from which the data may be accessed. Alternatively, databases containing personally identifiable information (e.g., name, address, social security number, date of birth, credit card number, etc.) can be assigned to a resource group (e.g., with more stringent security policies) whereas databases containing image metadata, advertising, or other non-sensitive information may be assigned to a separate resource group (e.g., with less stringent security policies). Alternatively, all web, application and database servers handing personally identifiable information can be assigned to a resource group. The criteria for grouping resources can be determined by the system or resource administrator based on their knowledge of which resources should be managed together.

In order to mitigate the threats from security exploits, a security system utilizing a plurality of microservices can be implemented. In conventional systems, when a new security exploit or vulnerability is identified that affects one or more resources (e.g., servers) in a resource group, exploit mitigation (e.g., new access control lists (ACLs), rules, and/or restrictions) is applied to all of the resources in the resource group. In such conventional systems, therefore, the exploit mitigation may be applied to resources regardless of whether they are impacted by new security exploit or vulnerability. However, because not all the resources within a particular resource group may be identical, applying the security mitigation to resources unaffected by the new security exploit or vulnerability can result in excessive fault positives/alerts, impairment to the speed at which the resources are processing data, and can consume excessive computing and networking resources. For example, some exploit mitigations processes include content processing or inspection, which can slow down the speed at which the resources can process data (e.g., network traffic).

The mitigation of threats from security exploits often includes the application of rules and policies that rely on the inspection of data. Such inspection of data can often result in false positives/alerts that consume time and resources. Applying rules and policies to resources which do not require them (e.g., because the resources are not impacted by the threats the rules and policies seek to address) can result in increased false positives/alerts.

To address the deficiencies of existing security infrastructures, embodiments detailed herein describe a security microservice that is configured to identify a resource group impacted by a security exploit, and further identify whether there is a disparate impact to resource group members of any identified resource group that are impacted by the security exploit. In some embodiments, the security microservice identifies a disparate impact to resource group members when one or more resources within the identified resource group are impacted while other resources in the identified resource group are not impacted. In response to determining that resource groups members of the identified resource group are disparately impacted, the security microservice splits the resource group into an impacted resource group and a non-impacted resource group and applies exploit mitigation to the resource group members in the impacted resource group. After the security microservice identifies that there is a resolution of the disparate impact to the members of the identified resource group, the security microservice combines the impacted resource group and the non-impacted resource group into a single resource group. By performing exploit mitigation through this process, the security microservice applies the exploit mitigation to members of a resource group that are actually impacted by the security exploit, while allowing any non-impacted resource group members to operate without any unnecessary modifications that can impede or otherwise negatively impact performance of the non-impacted resource group members.

FIG. 1 is a block diagram of network security system 100 illustrating computer hardware, including a memory (e.g., 104) and processor (e.g., 102), in accordance with the disclosed embodiments. Network security system 100 further includes a hard disk (e.g., 126) and network interface (e.g., 128). In one embodiment, hardware processor 102, memory 104, hard disk 126, and network interface 128 are coupled to each other via a system bus (e.g., 130). Network security microservices 108-122 are stored in memory 104 (e.g., volatile memory such as Random-Access Memory (RAM) and/or non-volatile memory such as solid-state storage or disk) and executed by one or more processor cores or hardware processor 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower hierarchy microservice decides (based on configuration, current statistics, and other information) as to which next microservice to utilize. Such a decision may constitute a load-balancing decision to assure that the higher hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security settings and policies (e.g., access control lists), and otherwise protect a data center using the microservices 108-122.

Embodiments of network security system 100 providing the above capabilities are now discussed in more detail. Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings and policies to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system 100 to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to manage the initialization and configuration of one or more of a plurality of microservices. For example, security service 124 is configured to initialize and configure an interface microservice to manage the hardware and software resources in a datacenter or other computing environment by managing the creation and modification of resource groups, including the resource members of the resource groups. Security serviced 124 also configures interface microservices to perform security processing to ensure that appropriate security policies and/or rules are applied to the resources to mitigate the vulnerability of the resources to threats from various security exploits. The processes disclosed herein can be performed by security service 124 or by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts but does not block the data. Hardware processor 102 may execute various data security microservices on the data. For example, as described hereinafter with respect to FIGS. 2 and 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
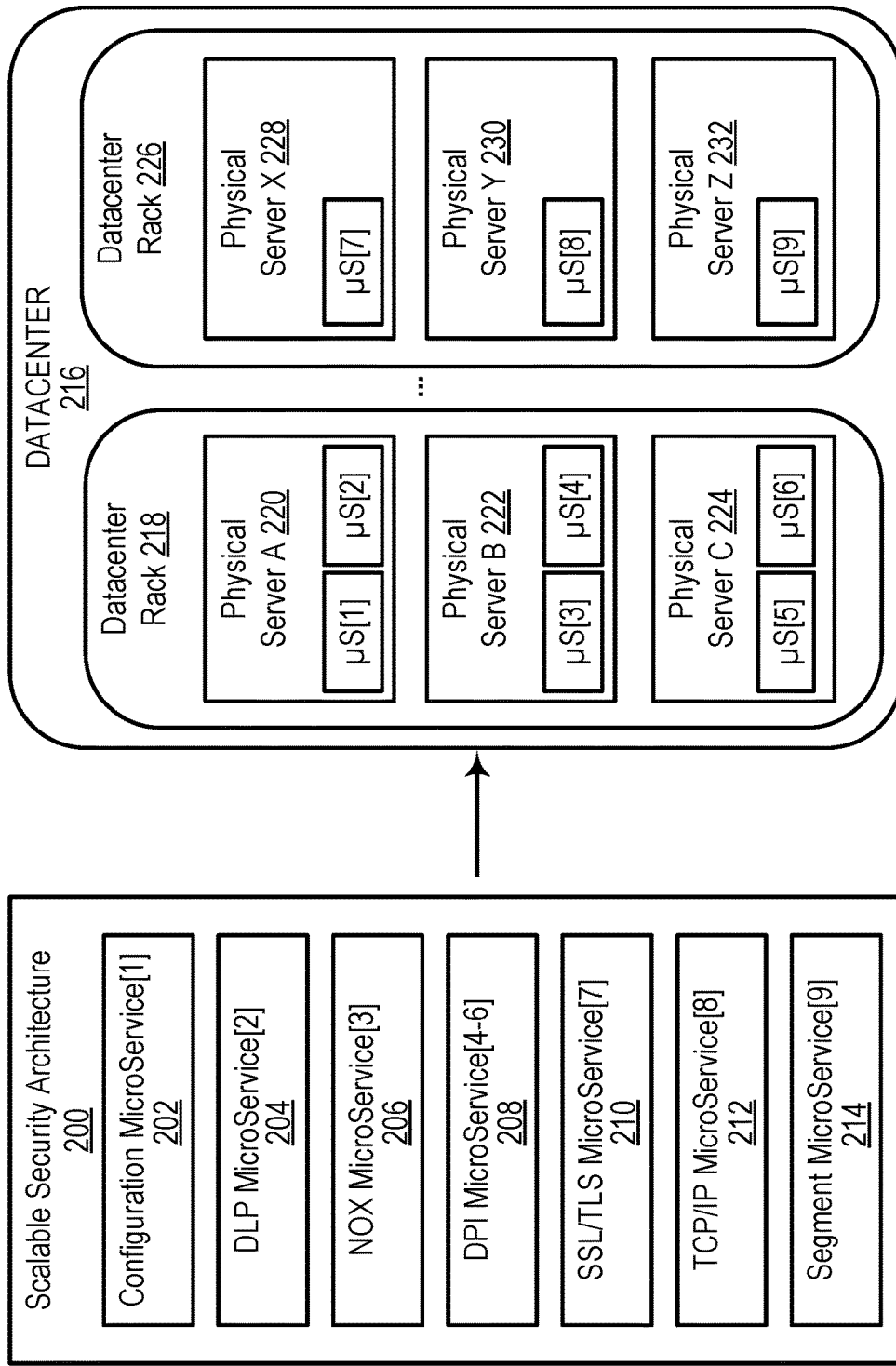
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

FIG. 3 illustrates an arbitrary scaling out of a microservice according to an embodiment. As shown, scalable security architecture 300 includes configuration microservice 302, DLP (2X) microservice 304 (a 2-times scale-out), NOX microservice 306, DPI (3λ) microservice 308 (a 3-times scale-out), SSL/TLS microservice 310, TCP/IP (3λ) microservice 312 (a 3-times scale-out), and segment microservice 314. As shown, configuration microservice 316 provisions (318, 320, 322, 324, 326, and 328) the 11 microservices from a lowest hierarchy to a highest hierarchy and configures them to communicate with each other via a backplane. The microservices, for example, may be implemented by physical servers in datacenter 330.

Figure 4:
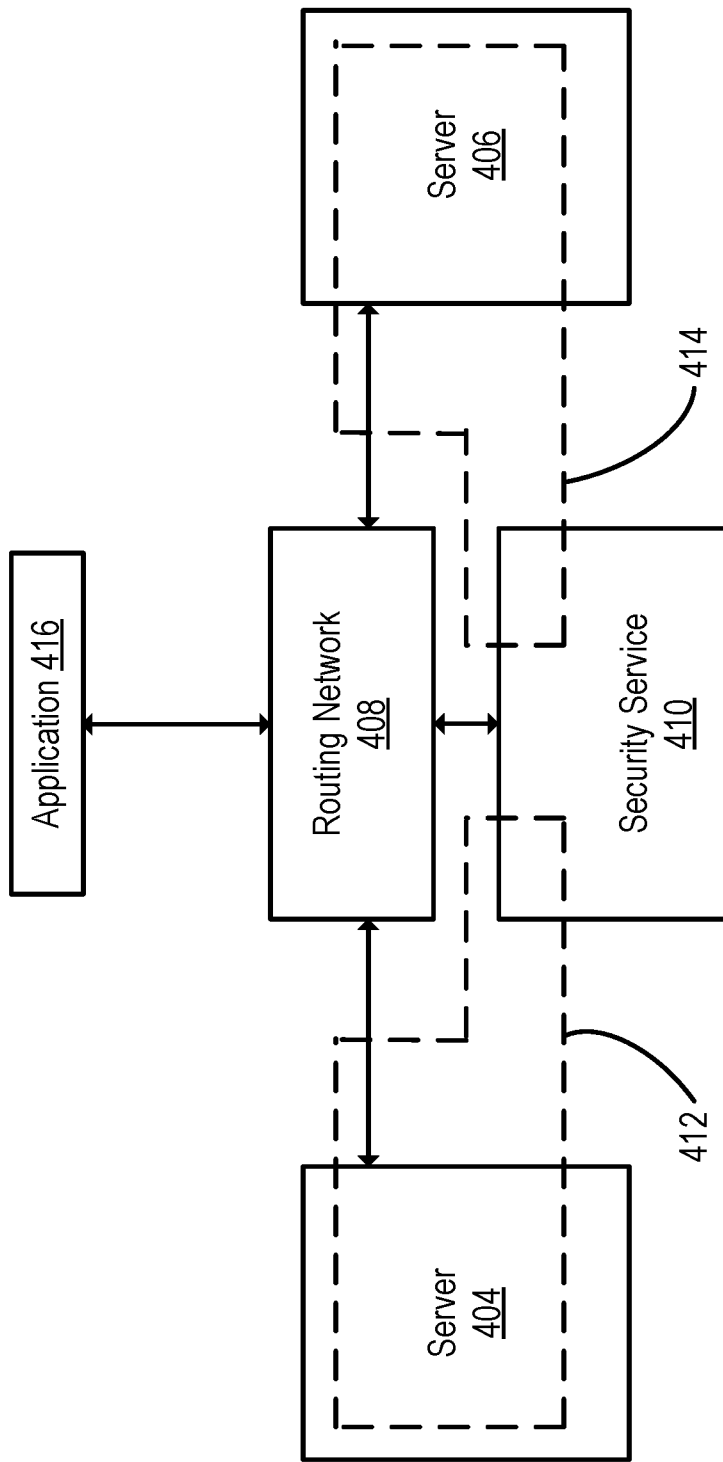
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between application 416 and one or more servers 404 and 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404 and 406. The microservices comprising security service 410 do not need to be confined to one physical server such as a server 404 and 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404 and 406, security service 410, and application 416 are deployed in a networked environment. Examples of networked environments include data centers, an on-premise stack, and a set of servers remotely connected using a network.

In one embodiment, a routing network 408 provides connectivity among servers 404 and 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
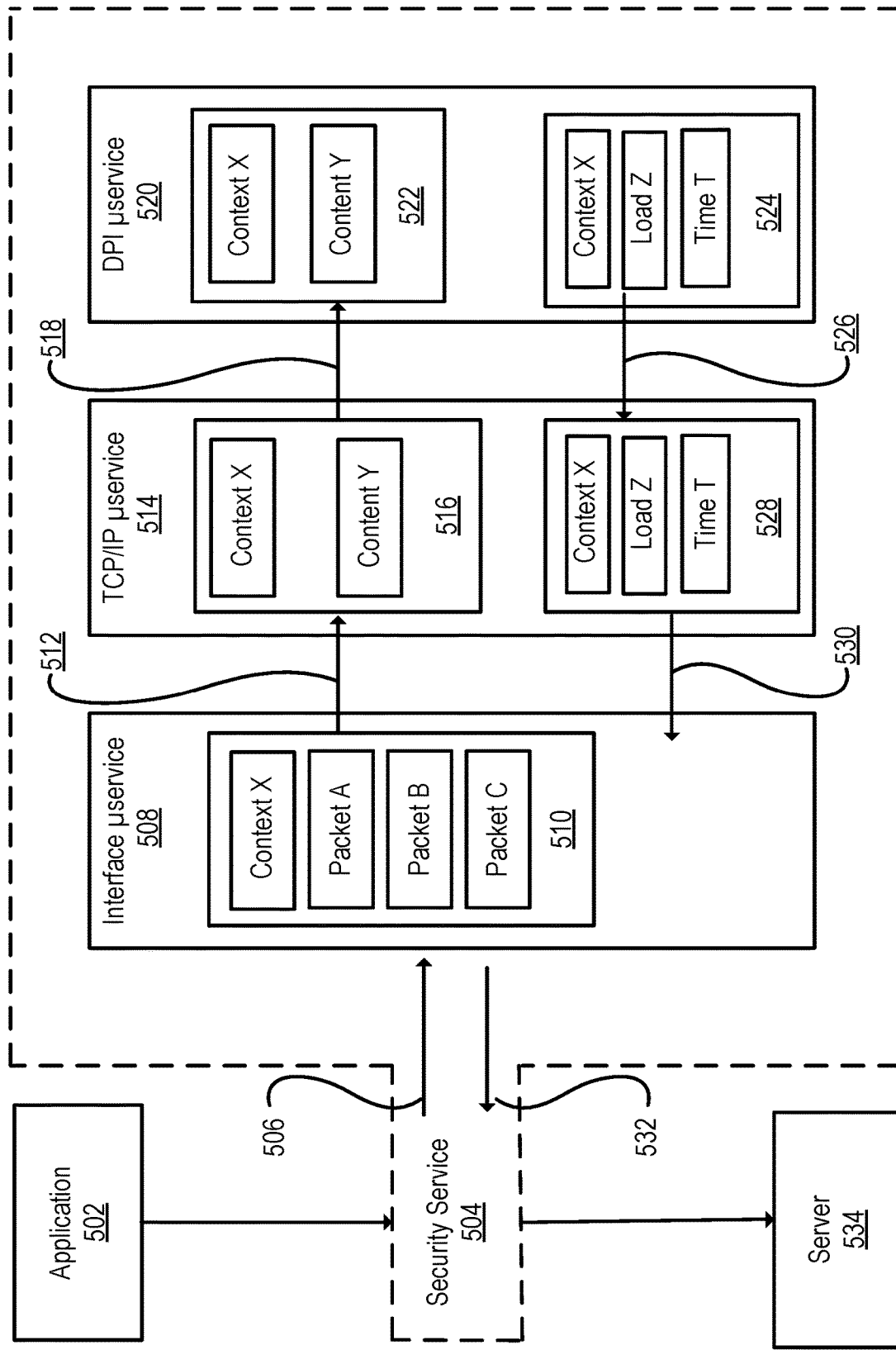
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network packet from application 502. In one embodiment, security service 504 is an example of security service 124 in FIG. 1. Security service 504 receives the packet (e.g., from an application or program that redirects packets to security service 504), and security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 524, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing.

By providing load and timestamp data in the channel data encapsulation packets 524 and 528, which are returned via transmission paths 526 and 530, the microservices receive and can maintain real-time loading and processing latency information utilized to make load balancing decisions.

Figure 6:
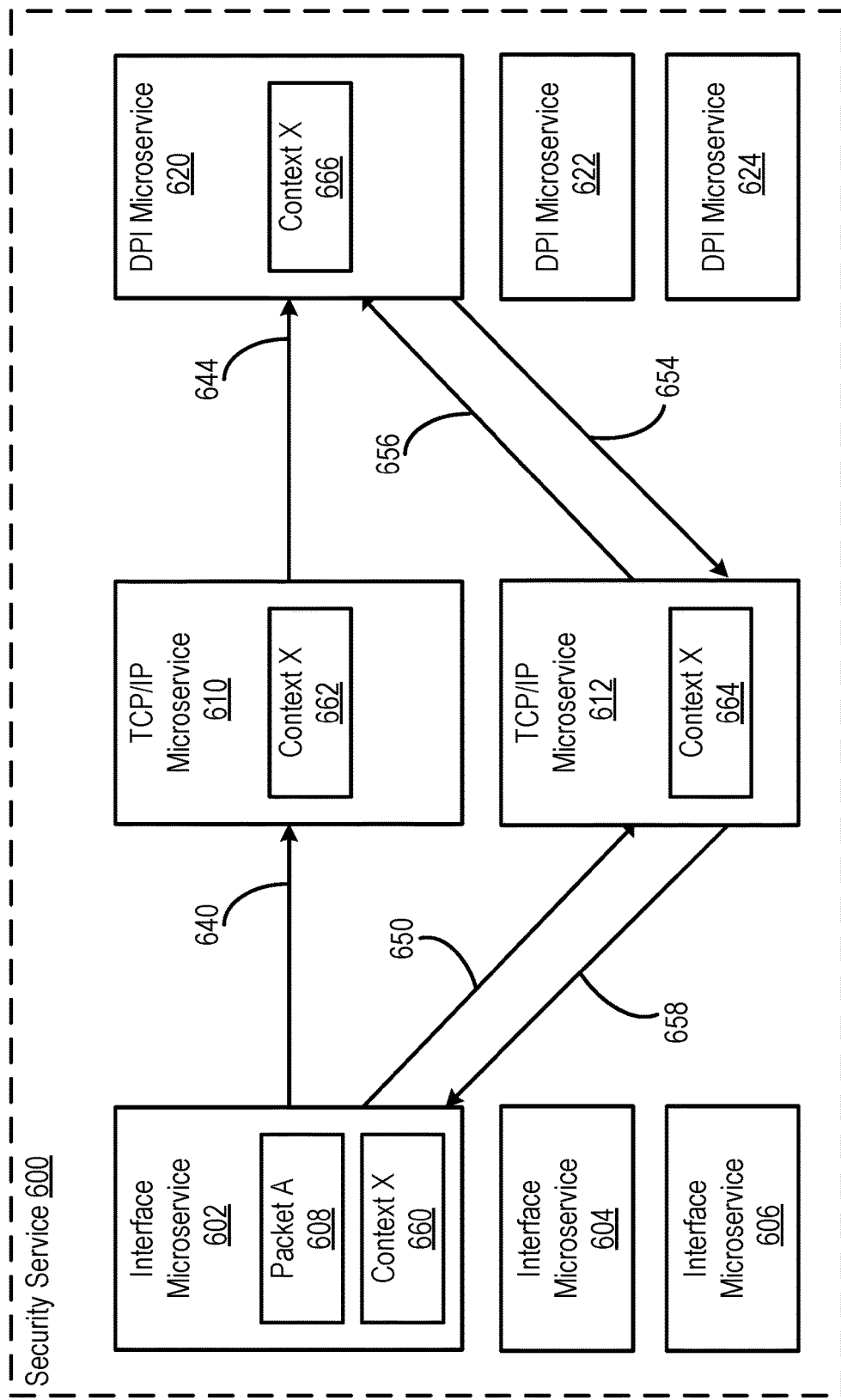
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security service 600 includes interface microservices 602, 604, and 606, TCP/IP microservices 610 and 612, and DPI microservices 620, 622, and 624. Other examples include a different number of microservices and/or a different number of microservice types. In one embodiment, security service 600 is an example of security service 124 in FIG. 1. In the example of FIG. 6, an interface microservice 602 receives packet A 608, and generates a context X 660.

One benefit of the security system illustrated in FIG. 6 is the handling of state. For example, if packets belong to a certain context X, the security service 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission path 640. Context X 662, when transmitted to DPI microservice 620 as part of transmission path 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security service 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and a state lookup or a context lookup, in addition to other information. Interface microservice 602 provides packet A 608 and context X 660 to TCP/IP microservice 610 or 612 via transmission paths 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via transmission paths 644 or 656, respectively. Along with the transmitted data, TCP/IP microservice 610 or 612 forwards context X 662 or 664, respectively, to DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via transmission path 650. TCP/IP microservice 612 performs some security processing, then transmits the second packet and context X 664 to DPI microservice 620 via transmission path 656. After performing some security processing, DPI microservice 620 responds to TCP/IP microservice 612 via transmission path 654, and TCP/IP microservice responds to interface microservice 602 via transmission path 658.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
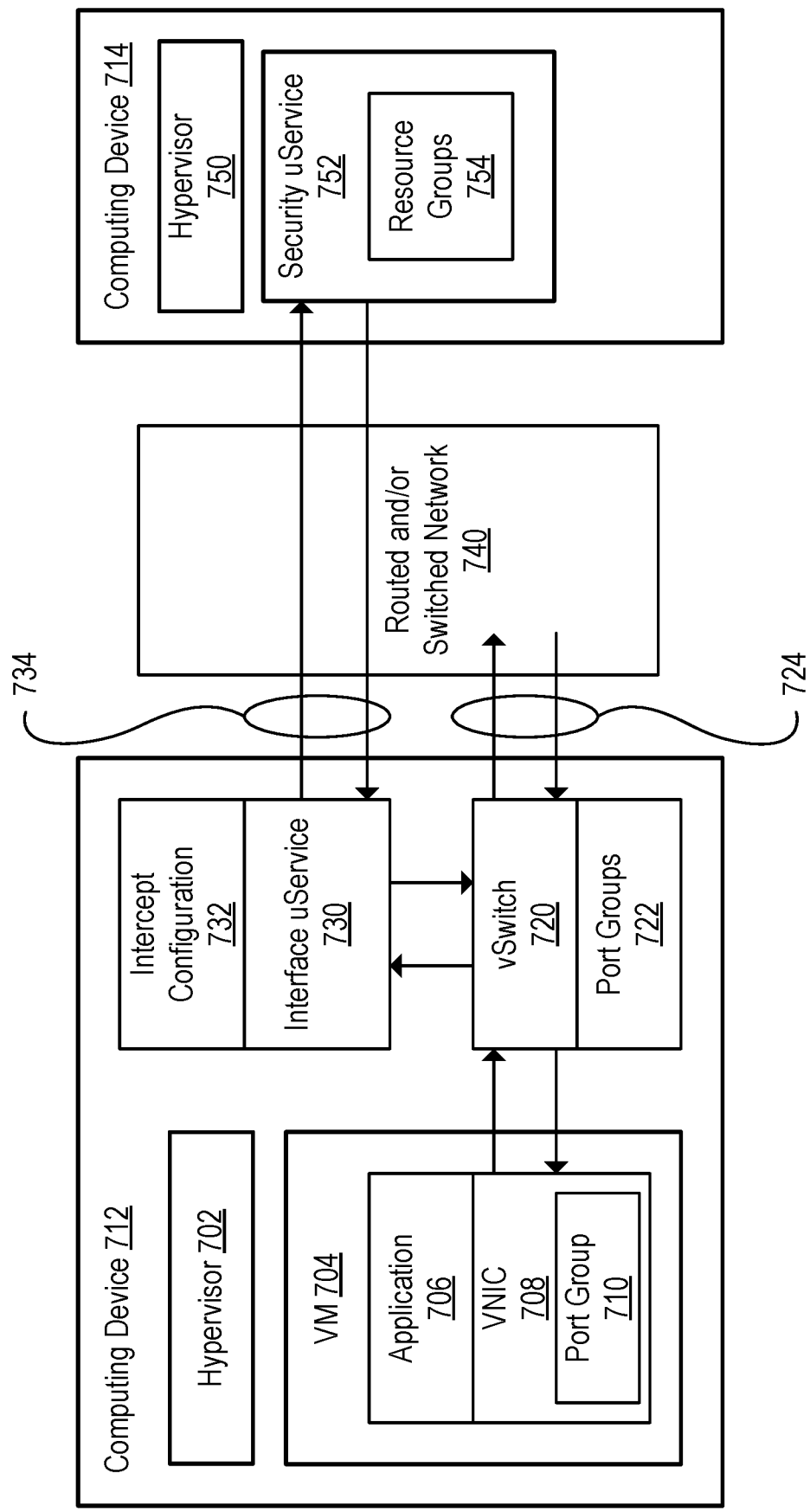
FIG. 7 is a block diagram illustrating an example system for intercepting network traffic for security processing based on resource group properties in accordance with the disclosed embodiments.

FIG. 7 is a block diagram illustrating an example system for intercepting network traffic for security processing based on resource group properties in accordance with the disclosed embodiments. In an embodiment, the system of FIG. 7 includes at least one computing device 712 coupled to at least one other computing device 714 via a routed and/or switched network 740. The routed and/or switched network 740, for example, can be a network within a data center interconnecting various types of devices within the data center, or any other type of network connecting computing devices 712, 714. Computing devices 712 and 714 include processing hardware and memory, the memory storing software to be executed by the processing hardware. FIG. 7 represents an example embodiment that is provided for purposes of illustrating a clear example; other embodiments may use different arrangements.

In an embodiment, the computing device 712 includes a hypervisor 702, vSwitch 720, and an interface microservice 730. The hypervisor 702 is a component implemented in software, hardware, firmware, or combinations thereof, and which manages the creation and operation of one or more virtual machines (VMs) (e.g., a VM 704). Hypervisors 702 and 750, VM 704, and vSwitch 720 are implemented using software stored in the memory of computing device 712 and/or 714 and executed by the processing hardware. In some embodiments, hypervisor 702 and the VMs it supports/manages (e.g., VM 704) are located on computing device 712. In other embodiments, hypervisor 702 and VM 704 are located on different physical machines or computing devices. In FIG. 7, interface microservice 730 on computing device 712 intercepts network traffic routed by vSwitch 720. In one embodiment, interface microservice 730 can be a single microservice or multiple microservices (e.g., microservices 108-122 from FIG. 1). In some embodiments, vSwitch 720 and port groups 722 are integrated into or otherwise part of hypervisor 702, configured via hypervisor 702, or some combination thereof.

In an embodiment, a VM 704 managed by hypervisor 702 is any type of emulated computer system that can share hardware resources with one or more other VMs managed by hypervisor 702. In the example of FIG. 7, a VM 704 includes at least one application 706 and at least one virtual network interface card (VNIC) 708. Examples of an application 706 include, but are not limited to, an operating system, a system application, and a user application.

In an embodiment, the VM 704 is one of a plurality of VMs networked as part of a virtual network. The plurality of VMs can be networked in part using one or more vSwitches (e.g., vSwitch 720). Whereas a physical Ethernet switch manages network traffic between machines on a physical network, a vSwitch manages network traffic between VMs logically connected to virtual ports of the vSwitch. A vSwitch can be connected to other vSwitches and to one or more physical switches (not shown in FIG. 7) using physical Ethernet adapters to join virtual networks with physical networks. For example, the network path 724 might connect the vSwitch 720 to a routed and/or switched network 740 via one or more physical switches.

In an embodiment, a VNIC 708 of a VM 704 is connected to a port of the vSwitch 720, and the port can be assigned to a port group 710. In one embodiment, port group 710 represents a port group identifier or another value indicating a specific port group. At a high level, a port group is a vSwitch configuration which defines a logical grouping of VNICs connected to the ports comprising the group. For example, the system of FIG. 7 can include any number of VMs 704 having any number of VNICs 708, and the VNICs can be grouped into any number of port groups by the vSwitch 720. A port group can be further associated with configuration options applied to the member ports including, for example, bandwidth limitations, traffic shaping rules, and other settings. In an embodiment, a vSwitch 720 stores configuration information related to port groups as port groups configuration 722. For example, when a vSwitch 720 receives a packet from a VNIC 708 of a VM 704, the vSwitch 720 can determine which port group 710 the VNIC 708 is associated with and tag the packet with a VLAN assigned to the port group in the port groups configuration 722.

An interface microservice 730 enables network traffic sent to and received from a VM 704 (and any other VMs generating network traffic routed by vSwitch 720) to be intercepted and filtered based on an intercept configuration 732. As shown in FIG. 7, an interface microservice 730 can optionally send, via network path 734, intercepted network traffic to a security microservice 752 running on a computing device 714. In one embodiment, the security microservice 752 can be a single microservice or multiple microservices (e.g., microservices 108-122 from FIG. 1). In one embodiment, the security microservice 752 is configured or implemented by a security service (e.g., security service 124 in FIG. 1). The computing device 714 includes a separate hypervisor 750 and may further include any number of VMs managed by hypervisor 750 (not shown). In other examples, the interface microservice 730 can perform various security operations locally at a security service at the computing device 712 without sending the intercepted network traffic to security microservice 752.

In one embodiment, the security microservice 752 is configured to manage resources running on computing devices 712 and/or 714 using the properties of resource groups 754. In one embodiment, resource groups 754 is a data structure storing metadata and information about each resource group and the resources contained in each resource group. In one embodiment, resources include database servers, web servers, virtual machines, storage servers, etc. In such embodiments, the metadata in resource groups 754 includes resource identifiers, version identifiers, policies and permissions associated with each resource group member, etc. For example, security microservice 752 provides security services for the monitored VM 704 wherein the selection or configuration of services is based, at least in part, on the resource group (one of research groups 754) to which VM 704 belongs. This membership may determine the types of services, the aspects of security policies the services enforce, the level of alerts, warnings or actions taken based on policy violations, or other aspects of service configuration.

In one embodiment, security microservice 752 performs security functions based on the properties of resource group 754. For example, if resource group 754 contains metadata identifying the members of resource group 754 as database servers, security microservice 752 applies security processing (such as content scanning, DLP, antivirus, etc.) designated for database servers. Alternatively, if resource group 754 contains metadata identifying the members of resource group 754 as processing personally identifying information, security microservice 752 applies content scanning configured to identify social security numbers, credit card numbers, etc.

In one embodiment, each resource group in resource groups 754 includes resource members that have an identical or substantially similar set of security policies and rules applied to them, e.g., because the resource members in the same resource group perform the same functions or run the same or similar applications. In another embodiment, each resource group includes resource members of the same type. For example, a first resource group can be composed of database servers, a second resource group can be composed of web servers, etc. In some embodiments, after grouping the resources into a resource group, the security microservice 752 applies a specific set of security policies and rules to the resources members of the resource group. In one embodiment, when a new server is created or implemented, the security microservice 752 identifies a type of the new server, assigns the new server to the specific resource group having the same types of servers as the new server, and assigns the policies of the specific resource group to the new server.

Figure 8:
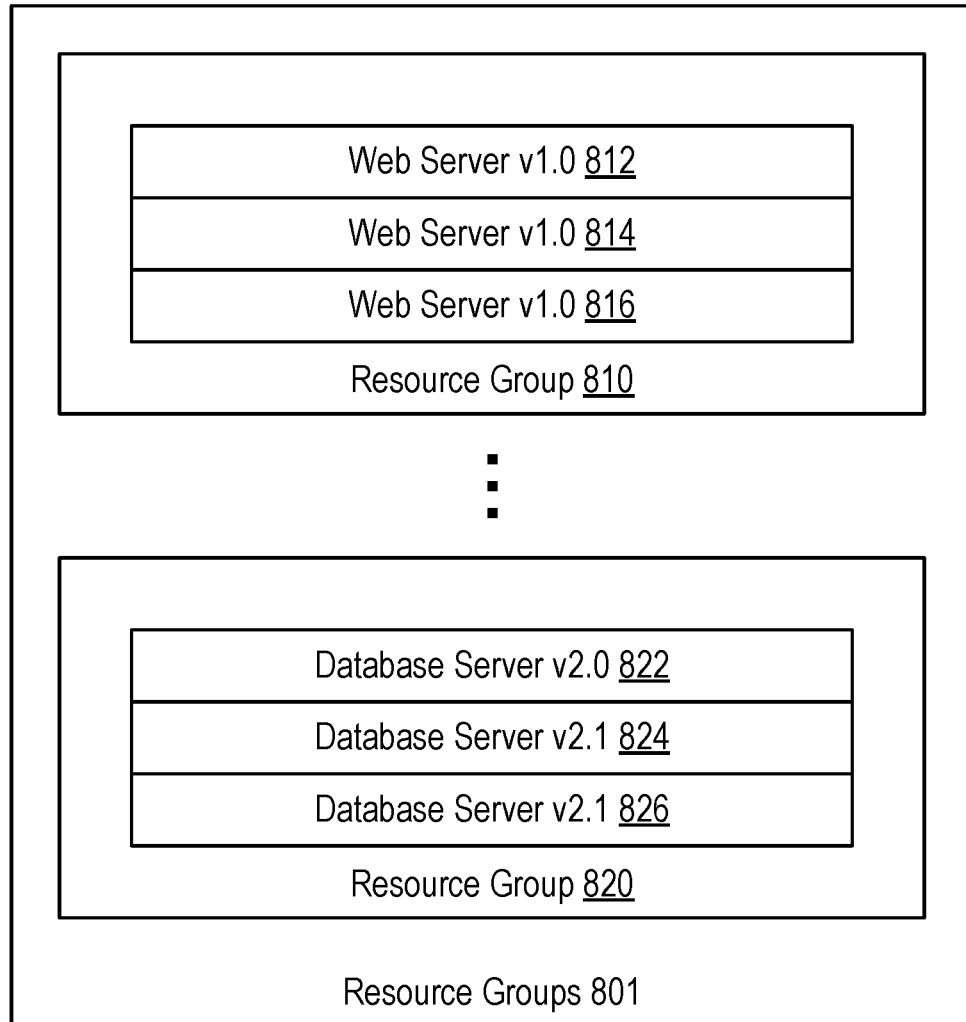
FIG. 8 is a block diagram illustrating example resource groups managed by a security microservice in accordance with the disclosed embodiments.

FIG. 8 is a block diagram illustrating example resource groups managed by a security microservice in accordance with the disclosed embodiments. In one embodiment, resource groups 801 is an example of resource groups 754. In the example in FIG. 8, resource group 810 includes a plurality of web servers 812-816, and resource group 820 includes a plurality of database servers 822-826. The resources (e.g., servers) within a resource group can be at the same patch level or be at different patch levels. For example, each of web servers 812-816 are running version 1.0 of a particular program or application, while in resource group 820, database server 822 is running version 2.0 of a particular program or application and database servers 824-826 are running version 2.1 of a particular program or application.

In FIG. 8, problems can result from database servers 824-826 running a different version of software from database server 822. For example, assume there is a threat targeting a vulnerability of servers running version 2.0 of the particular program or application, but does not affect servers running version 2.1 (and later) of the particular program or application. In this situation, of the database servers depicted in resource group 820, only database server 822 is vulnerable to the threat.

Existing solutions include applying a new access control list (ACL), rules, and/or restrictions to all of the servers in the resource group. In some embodiments, the vulnerability is mitigated by a software patch, a workaround, a rule, and/or a restriction. For example, the vulnerability can be mitigated by blocking a particular port, performing content inspection, performing significant processing, etc. However, this wastes resources and negatively impacts the bandwidths of unaffected or non-impacted servers (e.g., database servers 824-826), which were not vulnerable to the threat. In some other existing solutions, the vulnerability may be mitigated by upgrading the version of software. However, this may cause unacceptable downtime and may require testing to confirm compatibility with other software in the environment.

In one embodiment, rather than applying new ACLs, rules, and/or restrictions to all servers in a resource group, the security microservice 752 applies new ACLs, rules, and/or restrictions only to affected or impacted servers. Meanwhile, the security microservice 752 allows any unaffected or non-impacted servers to proceed normally without any policy modifications. Additional details are described with respect to FIG. 10.

Figure 9A:
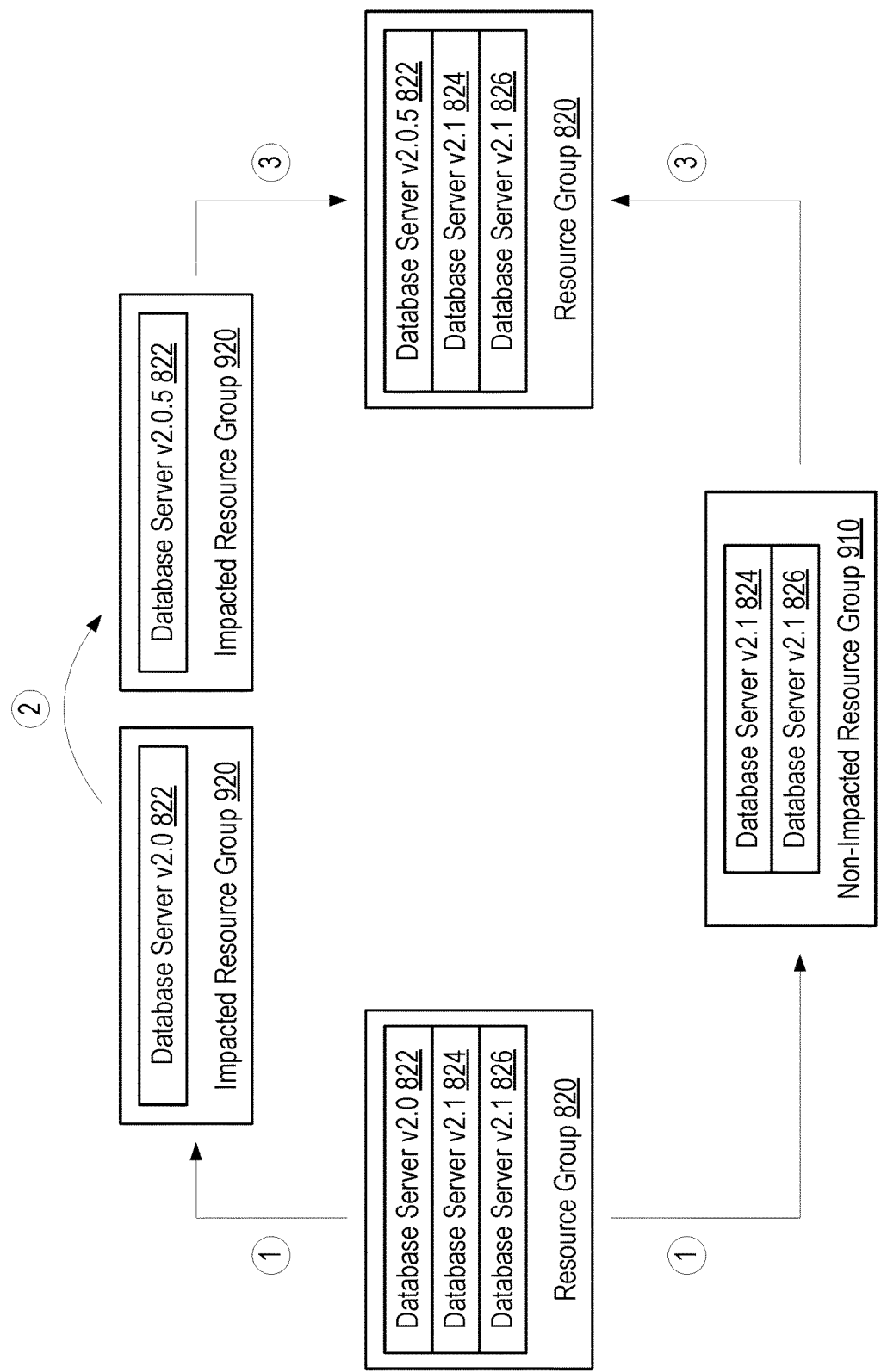
FIG. 9A is a block diagram illustrating a process for resolving a disparate impact to resources in a resource group in accordance with the disclosed embodiments.

FIG. 9A is a block diagram illustrating a process for resolving a disparate impact to resources in a resource group in accordance with the disclosed embodiments. FIG. 9A depicts resource group 820 from FIG. 8, where database server 822 is running version 2.0 of a particular program or application and database servers 824-826 are running version 2.1 of the particular program or application. At time 1, in response to a threat (e.g., security exploit) targeting a vulnerability of servers running version 2.0 of the particular program or application, a security microservice (e.g., security microservice 752) splits resource group 820 into two resource sub-groups: non-impacted resource group 910 and impacted resource group 920. Non-impacted resource group 910 includes database servers 824-826 and impacted resource group 920 includes database server 822.

After moving database server 822 into impacted resource group 920, the security microservice can apply additional rules and/or policies to network traffic directed to and from database server 822 to mitigate the threat from affecting database servers running version 2.0. While the security microservice applies these new rules and/or policies to the database server in impacted resource group 920, no such rules or policies are applied to the database servers in non-impacted resource group 910 because they are not impacted by the threat.

At time 2, database server 822 is updated to version 2.0.5 of the particular program or application, which resolves the threat to database server 822.

At time 3, in response to the resolution of the threat to database server 822, and, accordingly, the disparate impact to the resources originally in resource group 820, the security microservice combines the resources in non-impacted resource group 910 and impacted resource group 920 back into a single resource group 820. In one embodiment, the security microservice creates a new resource group and moves the resources from non-impacted resource group 910 and impacted resource group 920 into the new resource group. In another embodiment, the security microservice moves the resources in impacted resource group 920 into non-impacted resource group 910.

Figure 9B:
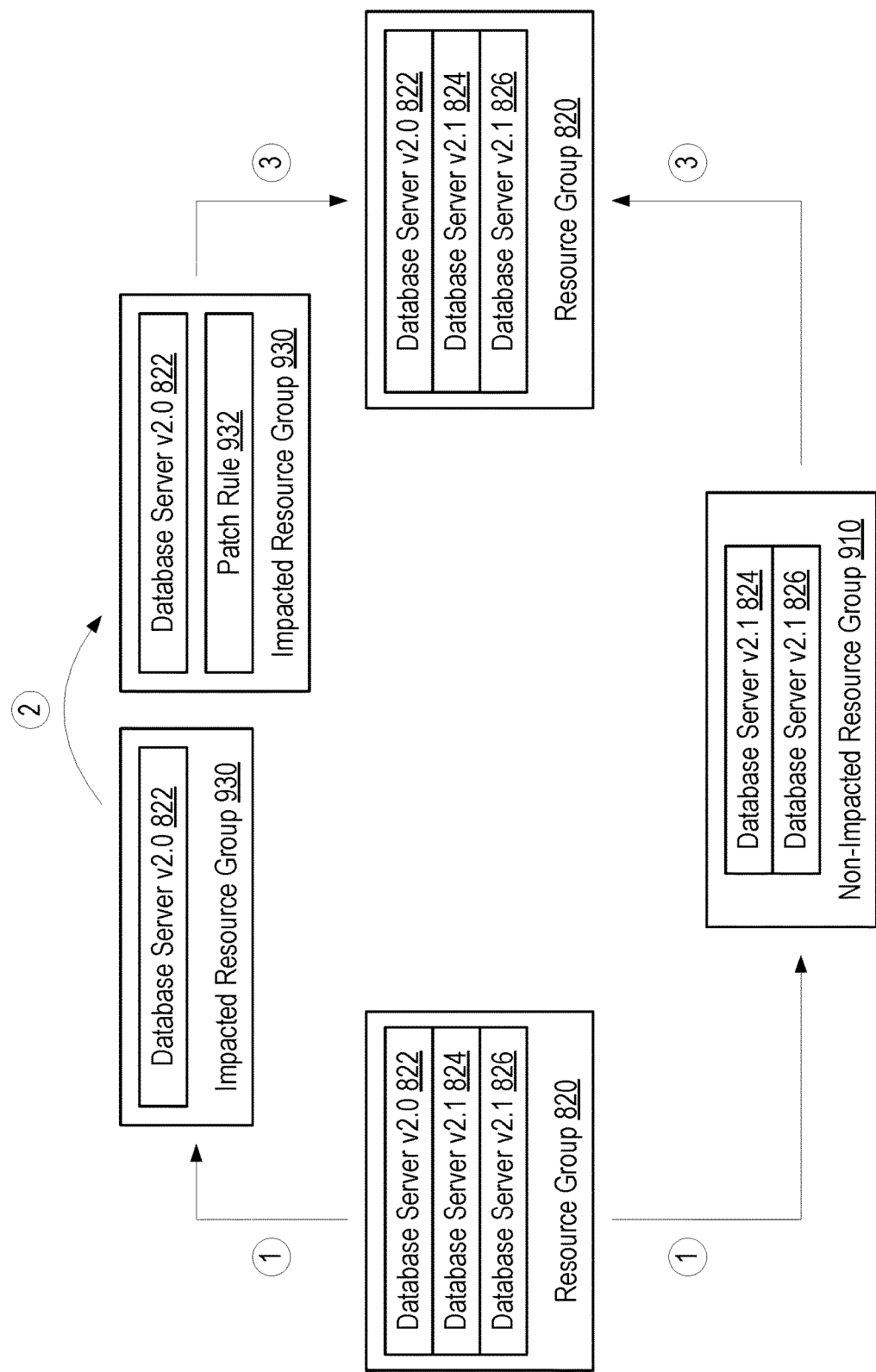
FIG. 9B is a block diagram illustrating a process for resolving a disparate impact to resources in a resource group in accordance with the disclosed embodiments.

FIG. 9B is a block diagram illustrating a process for resolving a disparate impact to resources in a resource group in accordance with the disclosed embodiments. The block diagram in FIG. 9B depicts a similar process to that described in FIG. 9A. At time 1, in response to a threat (e.g., security exploit) targeting a vulnerability of servers running version 2.0 of the particular program or application, a security microservice (e.g., security microservice 752) splits resource group 820 into two resource sub-groups: non-impacted resource group 910 and impacted resource group 930. Non-impacted resource group 910 includes database servers 824-826 and impacted resource group 930 includes database server 822.

At time 2, a patch rule 932 is applied to database server 822, which resolves the threat to database server 822. In this manner, the application of the patch rule 932 to database server 822 mitigates the threat to database server 822 even though database server 822 is running the version of the particular program or application affected by the threat. At time 3, in response to the resolution of the threat to database server 822, and, accordingly, the disparate impact to the resources originally in resource group 820, the security microservice combines the resources in non-impacted resource group 910 and impacted resource group 930 back into a single resource group 820.

Figure 10:
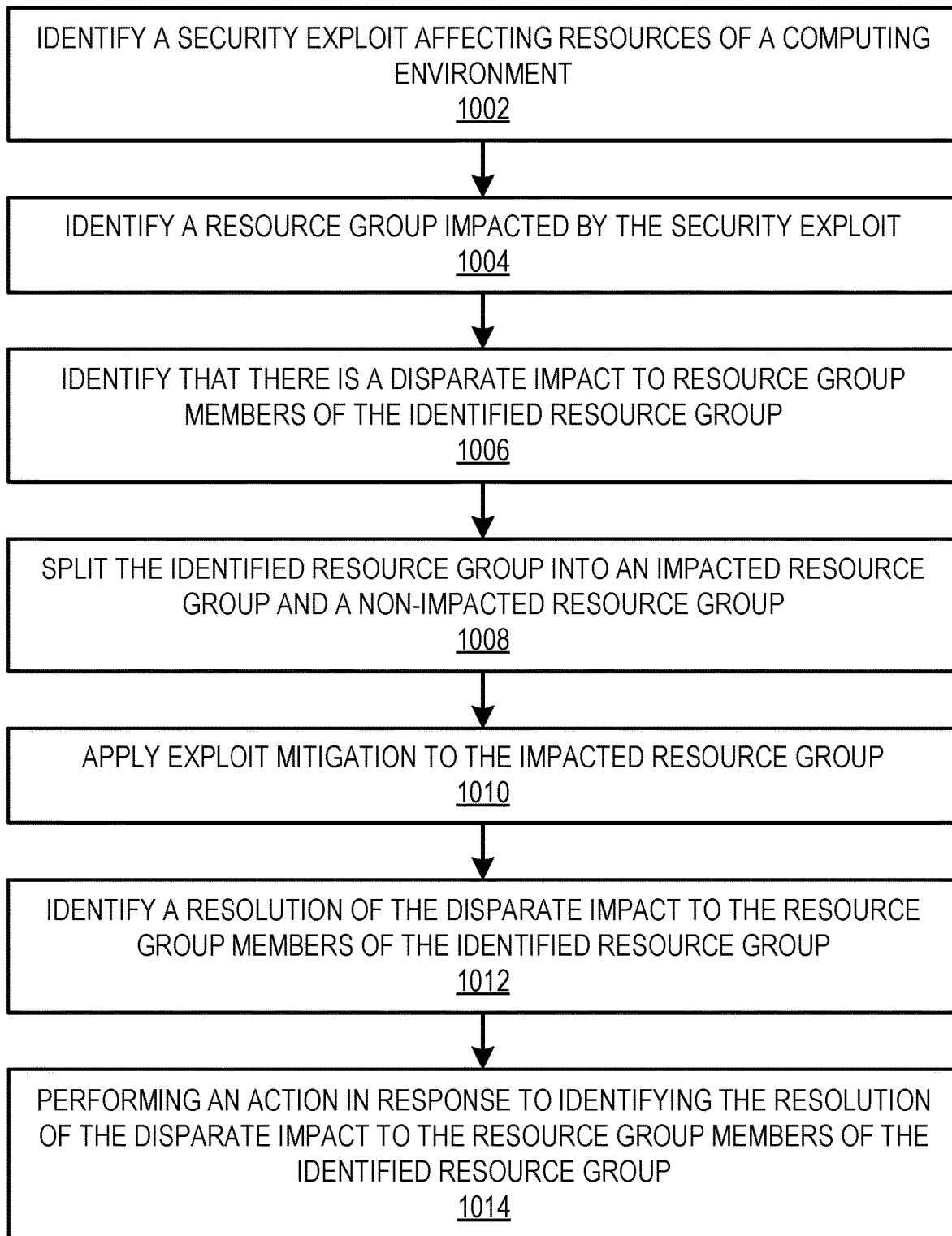
FIG. 10 is a flow diagram illustrating a process for mitigating security exploits disparately impacting resources within a resource group in accordance with an embodiment.

FIG. 10 is a flow diagram illustrating a process for mitigating security exploits disparately impacting resources within a resource group in accordance with an embodiment. For ease of understanding, the description of FIG. 10 below references components of the networked environments of FIGS. 1, 7, and 8, however, it is not limited to those components. In one embodiment, a security microservice (e.g., security microservice 752) performs the actions described below. In another embodiment, the security microservice receives is configured or instructed to perform the actions described below (e.g., by a security service). In such embodiments, the security service is an example of security service 124, depicted in FIG. 1. Further, a single security microservice may perform an action, or two more security services may perform the action either independently, or in conjunction. Although FIG. 10 describes operations performed by a security microservice (e.g., microservices 108-122), some or all of the operations described in FIG. 10 can be performed by a management microservice, a configuration microservice, another type of microservice, an application, or any other computer-executable logic.

At block 1002, a security microservice identifies a security exploit. In one embodiment, the security microservice receives an indication or information regarding a new or modified security exploit affecting resources of, or operating within, a computing environment. In one embodiment, the security microservice can receive an alert or notification message. An example notification can include a message stating, "mysql servers prior to version 4.1 require a security patch." In one embodiment, information regarding security exploits is made available through a subscription service from a third-party system. In one embodiment, information regarding security exploits is made available through a communication from a software vendor. In another embodiment, information regarding security exploits is discovered by operators or security personnel through observation or analysis of the security exploit.

At block 1004, the security microservice identifies a resource group impacted by the security exploit. In some embodiments, the security microservice is configured to manage one or more resource groups. In one embodiment, each resource group is associated with a resource group identifier. In some embodiments, the security microservice assesses each resource group in the one or more resource groups to determine the impact of the security exploit on each resource group. In one embodiment, a resource group is impacted when at least one member of the resource group is impacted by the security exploit. In one embodiment, the security microservice can classify each resource group into one of three categories: non-impacted, disparately impacted, and fully impacted. A resource group is non-impacted when there are no members of the resource group impacted by the security exploit. A resource group is fully impacted when all of the members of the resource group are impacted by the security exploit. A resource group is disparately impacted when some members are impacted while other members are non-impacted by the security exploit.

At block 1006, the security microservice identifies that there is a disparate impact to resource group members of the identified resource group. For example, using the example resource groups of FIG. 8, assuming the security exploit impacts database servers running versions of a particular program or application older than version 2.1, resource group 820 is disparately impacted. Resource group 810 is non-impacted because it does not contain any database servers.

At block 1008, the security microservice splits the identified resource group into an impacted resource group and a non-impacted resource group. In one embodiment, after identifying that the identified resource group is disparately impacted, the security microservice identifies the members of the identified resource group that are impacted and the members of the identified resources group that are non-impacted, creates the impacted resource group and the non-impacted resource group, and associates the members of the resource group with either the impacted resource group or the non-impacted resource group. In such an embodiment, the impacted resource group and the non-impacted resource group can be considered sub-groups of the identified resource group. In one embodiment, the security microservice assigns new resource group identifiers to each of the impacted resource group and the non-impacted resource group.

In one embodiment, the security microservice causes the creation of a first data structure for the first set of resource group members and a second data structure for the second set of resource group members, moves first metadata for the first set of resource group members from the identified resource group to the first data structure, and movies second metadata for the second set of resource group members from the identified resource group to the second data structure. In one embodiment, the security microservice creates an association between the first data structure and the second data structure.

In an alternative embodiment, the security microservice removes the impacted members of the resource group from the identified resource group and places them into the impacted resource group, while maintaining the non-impacted members of the resource group in the identified resource group. In such an embodiment, the security microservice generates a new resource group identifier for the impacted resource group, while the security microservice does not affect the non-impacted members of the group, maintaining them in the identified resource group.

In one embodiment, the security microservice creates a field in each of the sub-groups indicating the resource group identifier of the identified resource group from which the sub-groups were created. In one embodiment, the security service monitors all resource groups to determine when a change to a resource sub-group (such as an update of software version) causes that resource sub-group to become identical to another resource sub-group originating from the same original resource group. In one embodiment, this monitoring consists of comparing the software versions within all resource sub-groups subsequent to an upgrade of software version within any resource sub-group. In one embodiment, the security service periodically checks all resource sub-groups to determine if two or more resource sub-groups from the same original resource group have identical software versions.

At block 1010, the security microservice applies exploit mitigation to the impacted resource group. In one embodiment, the security microservice applies a patch, a rule, a restriction, and/or a workaround to mitigate the threat of the security exploit to the members of the impacted resource group. For example, the security microservice can shut down traffic to and/or from a resource, restart an impacted resource, etc. Concurrently, the resource group members in the non-impacted resource group can continue to operate without the security microservice applying the exploit mitigation to its members and their network traffic.

At block 1012, the security microservice identifies a resolution of the disparate impact to the members of the identified resource group. For example, the security microservice determines the disparate impact is resolved when all members of the identified resource group (e.g., the members in the impacted resource sub-group and the members of the non-impacted resource sub-group) are no longer impacted or affected by the security exploit.

In one embodiment, the security microservice identifies that there is no longer a disparate impact among the members of the identified resource group (e.g., the resource group identified in block 1004) after applying the exploit mitigation to the members of the impacted resource group.

In one embodiment, the disparate impact can be resolved when (1) the members of the impacted resource group are updated to the same version of a particular program or application as the non-impacted members (e.g., database server 822 is updated from version 2.0 to version 2.1); (2) the members of the impacted resource group are updated to a version of the particular program or application that addresses the threat that is a different version of the particular program or application as the non-impacted members (e.g., database server 822 is updated from version 2.0 to version 2.0.1); or (3) a patch is applied to the members of the impacted resource group. Thus, the resolution of the disparate impact to the members of the identified resource group can be identified even when the members are not running the same version of a particular program or application.

In one embodiment, after applying the exploit mitigation to the members of the impacted resource group, the security microservice monitors the members of the impacted resource group to determine whether the exploit mitigation has mitigated the threat of the security exploit. For example, the security microservice can monitor the members of the impacted resource group for a predetermined amount of time after applying the exploit mitigation before being able to determine that the members of the impacted resource group are no longer vulnerable to the security exploit.

At block 1014, the security microservice performs an action in response to identifying the resolution of the disparate impact to the resource group members of the identified resource group. In some embodiments, the security microservice combines the impacted resource group and the non-impacted resource group into a single resource group. In some embodiments, after combining the members of the impacted resource group and the non-impacted resource, the combined resource group contains the same members as the identified resource group (e.g., the resource group identified in block 1004). In one embodiment, the security service combines the impacted and non-impacted resource groups by disabling network traffic to the members of the impacted resource group, verifying the quiescence of processing by the members of the impacted resource group (e.g., by monitoring the number of active connections being processed, number of open database handles, etc.), and adding the members of the impacted resource group to the non-impacted resource group. In one embodiment, the security service removes, or otherwise disables, the (now-empty) impacted resource group and any policies assigned to impacted resource group. Further, the security service enables network traffic to the former members of the impacted resource group (now members of the original resource group identified in block 1004) and rebalances network traffic to all members of the original resource group.

In other embodiments, after determining that there is a resolution of the disparate impact to the members of the identified resource group, the security microservice generates and sends a notification to an administrator with an indication of a resolution of the condition that led to the splitting of the identified resource group.

In an alternative embodiment, the security microservice determines that a resource group is disparately impacted when different members of the resource group are impacted differently by the security exploit. This can occur when a first set of resources and a second set of resources within the identified resource group are both impacted but in different ways. For example, again using the example resource groups of FIG. 8, a security exploit can impact database servers running version 2.0 of a particular program or application and database server operating version 2.1 of the particular program or application differently. In such embodiments, the security microservice can split the identified resource group into more than two groups (e.g., a first impacted resource group, a second impacted resource group, and a non-impacted resource group). In such embodiments, splitting of resources groups can be performed iteratively or as a single operation.

In another alternative embodiment, prior to identifying a resolution of the disparate impact to members of the identified resource group (as described in block 1012), the security microservice can identify an additional security exploit disparately impacting the resource group members of the identified resource group. For example, the additional security exploit can have a disparate impact on the impacted resource group and/or the non-impacted resource group. In such situations, the security microservice can further split the impacted resource group and/or the non-impacted resource group based on how they are disparately impacted.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 11:
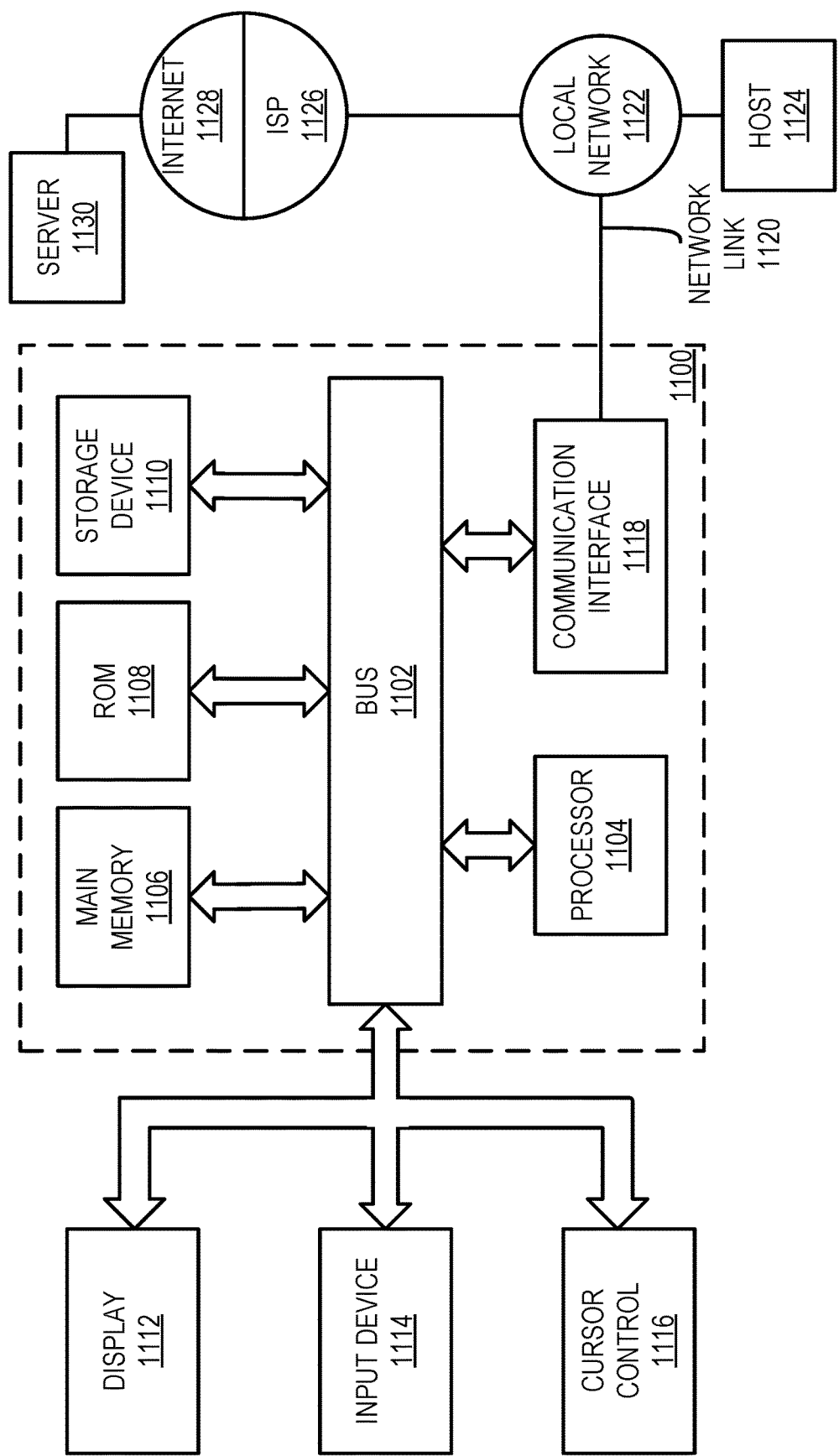
FIG. 11 is a block diagram that illustrates a computer system utilized in implementing the above-described techniques in accordance with some of the disclosed embodiments.

FIG. 11 is a block diagram that illustrates a computer system 1100 utilized in implementing the above-described techniques in accordance with some of the disclosed embodiments. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more buses 1102 or other communication mechanism for communicating information, and one or more hardware processors 1104 coupled with buses 1102 for processing information. Hardware processors 1104 may be, for example, general purpose microprocessors. Buses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random-access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1112.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In one embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in one embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As another example, the one or more communication interfaces 1118 may include a wireless network interface controller, such as an 802.11-based controller, Bluetooth controller, Long Term Evolution (LTE)

modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a service provider. Internet Service Provider (ISP) 1126, which may be an example of a service provider, in turn provides data communication services through a wide area network, such as the world-wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In one embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In one embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: identifying a security exploit affecting resources of a computing environment. The method further comprises identifying a resource group impacted by the security exploit. The method further comprises identifying that there is a disparate impact to resource group members of the identified resource group. The method further comprises splitting the identified resource group into an impacted resource group and a non-impacted resource group. The method further comprises applying exploit mitigation to the impacted resource group. The method further comprises identifying a resolution of the disparate impact to the resource group members of the identified resource group. The method further comprises performing an action in response to identifying the resolution of the disparate impact to the resource group members of the identified resource group.

In some embodiments, one or more of the following applies: 1) identifying that there is the disparate impact to the resource group members of the identified resource group comprises identifying a first set of resource group members as impacted by the security exploit and a second set of resource group members as non-impacted by the security exploit; 2) splitting the identified resource group into the impacted resource group and the non-impacted resource group comprises generating a first data structure for the first set of resource group members and a second data structure for the second set of resource group members, moving first metadata for the first set of resource group members from the identified resource group to the first data structure, moving second metadata for the second set of resource group members from the identified resource group to the second data structure, and associating the first data structure and the second data structure; 3) splitting the identified resource group into the impacted resource group and the non-impacted resource group comprises generating a first data structure for the first set of resource group members, moving metadata for the first set of resource group members from the identified resource group to the first data structure, and associating the first data structure with the identified resource group; 4) performing the action in response to identifying the resolution of the disparate impact to the resource group members of the identified resource group comprises combining the impacted resource group and the non-impacted resource group into a single resource group; 5) combining the impacted resource group and the non-impacted resource group into the single resource group comprises merging the first set of resource group members into the non-impacted resource group; and 6) identifying the resolution of the disparate impact to the resource group members of the identified resource group comprises determining that the first set of resource group members of the impacted resource group are updated to a same version of an application as the second set of resource group members of the non-impacted resource group.

In some embodiments, one or more non-transitory computer-readable storage media store instructions which, when executed by one or more hardware processors, cause performance of a method comprising: identifying a security exploit affecting resources of a computing environment. The method further comprises identifying a resource group impacted by the security exploit. The method further comprises identifying that there is a disparate impact to resource group members of the identified resource group. The method further comprises splitting the identified resource group into an impacted resource group and a non-impacted resource group. The method further comprises applying exploit mitigation to the impacted resource group. The method further comprises identifying a resolution of the disparate impact to the resource group members of the identified resource group. The method further comprises performing an action in response to identifying the resolution of the disparate impact to the resource group members of the identified resource group.

In some embodiments, one or more of the following applies: 1) identifying that there is the disparate impact to the resource group members of the identified resource group comprises identifying a first set of resource group members as impacted by the security exploit and a second set of resource group members as non-impacted by the security exploit; 2) splitting the identified resource group into the impacted resource group and the non-impacted resource group comprises generating a first data structure for the first set of resource group members and a second data structure for the second set of resource group members, moving first metadata for the first set of resource group members from the identified resource group to the first data structure, moving second metadata for the second set of resource group members from the identified resource group to the second data structure, and associating the first data structure and the second data structure; 3) splitting the identified resource group into the impacted resource group and the non-impacted resource group comprises generating a first data structure for the first set of resource group members, moving metadata for the first set of resource group members from the identified resource group to the first data structure, and associating the first data structure with the identified resource group; 4) performing the action in response to identifying the resolution of the disparate impact to the resource group members of the identified resource group comprises combining the impacted resource group and the non-impacted resource group into a single resource group; 5) combining the impacted resource group and the non-impacted resource group into the single resource group comprises merging the first set of resource group members into the non-impacted resource group; and 6) identifying the resolution of the disparate impact to the resource group members of the identified resource group comprises determining that the first set of resource group members of the impacted resource group are updated to a same version of an application as the second set of resource group members of the non-impacted resource group.

In some embodiments, an apparatus comprises: one or more hardware processors; and memory coupled to the one or more hardware processors, the memory storing instructions which, when executed by the one or more hardware processors, cause the apparatus to: identify a security exploit affecting resources of a computing environment. The instructions further cause the apparatus to identify a resource group impacted by the security exploit. The instructions further cause the apparatus to identify that there is a disparate impact to resource group members of the identified resource group. The instructions further cause the apparatus to split the identified resource group into an impacted resource group and a non-impacted resource group. The instructions further cause the apparatus to apply exploit mitigation to the impacted resource group. The instructions further cause the apparatus to identify a resolution of the disparate impact to the resource group members of the identified resource group. The instructions further cause the apparatus to perform an action in response to identifying the resolution of the disparate impact to the resource group members of the identified resource group.

In some embodiments, one or more of the following applies: 1) identifying that there is the disparate impact to the resource group members of the identified resource group further causes the apparatus to identify a first set of resource group members as impacted by the security exploit and a second set of resource group members as non-impacted by the security exploit; 2) splitting the identified resource group into the impacted resource group and the non-impacted resource group further causes the apparatus to generate a first data structure for the first set of resource group members and a second data structure for the second set of resource group members, move first metadata for the first set of resource group members from the identified resource group to the first data structure, move second metadata for the second set of resource group members from the identified resource group to the second data structure, and associate the first data structure and the second data structure; 3) splitting the identified resource group into the impacted resource group and the non-impacted resource group further causes the apparatus to generate a first data structure for the first set of resource group members, move metadata for the first set of resource group members from the identified resource group to the first data structure, and associate the first data structure with the identified resource group; 4) performing the action in response to identifying the resolution of the disparate impact to the resource group members of the identified resource group further causes the apparatus to combine the impacted resource group and the non-impacted resource group into a single resource group; 5) combining the impacted resource group and the non-impacted resource group into the single resource group further causes the apparatus to merge the first set of resource group members into the non-impacted resource group; and 6) identifying the resolution of the disparate impact to the resource group members of the identified resource group further causes the apparatus to determine that the first set of resource group members of the impacted resource group are updated to a same version of an application as the second set of resource group members of the non-impacted resource group.

What is claimed is:

1. A computer-implemented method comprising:
    during runtime, identifying, by a security service executing on one or more processors, a plurality of resource groups, each resource group having at least one computing resource available to a host computing system, wherein the host computing system provides a plurality of security microservices that have a hierarchical organization and are independent of each other;
    identifying a security exploit and, using at least one of the plurality of microservices, identifying a first a resource group from the plurality of resource groups as impacted by a security exploit;
    splitting the first resource group into an impacted resource group comprising those impacted by the security exploit and a second resource group comprising those not impacted by the security exploit;
    intercepting traffic directed to and from the first resource group by configuring an interface microservice to operate in-line for the first resource group while not intercepting traffic directed to a non-impacted resource group;
    applying an exploit mitigation to at least a portion of the intercepted traffic with one or more of the plurality of security microservices; and
    determining that the security exploit has been resolved with the one or more of the plurality of security microservices.

2. The computer-implemented method of claim 1, wherein identifying that there is a disparate impact to the resource group members of the identified resource group comprises identifying a first set of resource group members as impacted by a security exploit and a second set of resource group members as non-impacted by the security exploit with one or more of the plurality of security microservices.

3. The computer-implemented method of claim 2, further comprising splitting the identified resource group into the impacted resource group and the non-impacted resource group with one or more of the plurality of security microservices by:
    generating a first data structure for the first set of resource group members and a second data structure for the second set of resource group members;
    moving first metadata for the first set of resource group members to the first data structure;
    moving second metadata for the second set of resource group members to the second data structure; and
    associating the first data structure and the second data structure.

4. The computer-implemented method of claim 2, further comprising splitting the identified resource group into the impacted resource group and the non-impacted resource group with one or more of the plurality of security microservices by:
    generating a first data structure for the first set of resource group members;
    moving metadata for the first set of resource group members to the first data structure; and
    associating the first data structure with the identified resource group.

5. The computer-implemented method of claim 1 further comprising combining the impacted resource group and the non-impacted resource group into a single resource group in response to determining if the security exploit has been resolved with one or more of the plurality of security microservices.

6. The computer-implemented method of claim 2, wherein determining if the security exploit has been resolved with one or more of the plurality of security microservices comprises determining that the first set of resource group members are updated to the same version of an application as the second set of resource group members.

7. One or more non-transitory computer-readable storage media storing instructions which, when executed by one or more hardware processors, cause performance of a method comprising:
    during runtime, identifying, by a security service executing on one or more processors, a plurality of resource groups, each resource group having at least one computing resource available to a host computing system, wherein the host computing system provides a plurality of security microservices that have a hierarchical organization and are independent of each other;
    identifying a security exploit and, using at least one of the plurality of microservices, identifying a first a resource group from the plurality of resource groups as impacted by a security exploit;
    splitting the first resource group into an impacted resource group comprising those impacted by the security exploit and a second resource group comprising those not impacted by the security exploit;
    intercepting traffic directed to and from the first resource group by configuring an interface microservice to operate in-line for the first resource group while not intercepting traffic directed to a non-impacted resource group;
    applying an exploit mitigation to at least a portion of the intercepted traffic with one or more of the plurality of security microservices; and
    determining that the security exploit has been resolved with the one or more of the plurality of security microservices.

8. The non-transitory computer-readable storage media of claim 7, wherein identifying that there is a disparate impact to the resource group members of the identified resource group comprises identifying a first set of resource group members as impacted by a security exploit and a second set of resource group members as non-impacted by the security exploit with one or more of the plurality of security microservices.

9. The non-transitory computer-readable storage media of claim 8, further comprising splitting the identified resource group into the impacted resource group and the non-impacted resource group with one or more of the plurality of security microservices by:

generating a first data structure for the first set of resource group members and a second data structure for the second set of resource group members;

moving first metadata for the first set of resource group members to the first data structure;

moving second metadata for the second set of resource group members to the second data structure; and associating the first data structure and the second data structure.

10. The non-transitory computer-readable storage media of claim 8, further comprising splitting the identified resource group into the impacted resource group and the non-impacted resource group with one or more of the plurality of security microservices by:

generating a first data structure for the first set of resource group members;

moving metadata for the first set of resource group members to the first data structure; and associating the first data structure with the identified resource group.

11. The non-transitory computer-readable storage media of claim 7 further comprising combining the impacted resource group and the non-impacted resource group into a single resource group in response to determining if the security exploit has been resolved with one or more of the plurality of security microservices.

12. The non-transitory computer-readable storage media of claim 8, wherein determining if the security exploit has been resolved with one or more of the plurality of security microservices comprises determining that the first set of resource group members are updated to a same version of an application as the second set of resource group members.

13. An apparatus comprising:
one or more hardware processors;
memory coupled to the one or more hardware processors, the memory storing instructions which, when executed by the one or more hardware processors, causes the apparatus to:

during runtime, identify, by a security service executing on one or more processors, a plurality of resource groups, each resource group having at least one computing resource available to a host computing system, wherein the host computing system provides a plurality of security microservices that have a hierarchical organization and are independent of each other;

identify a security exploit and, using at least one of the plurality of microservices, identifying a first a resource group from the plurality of resource groups as impacted by a security exploit;

split the first resource group into an impacted resource group comprising those impacted by the security exploit and a second resource group comprising those not impacted by the security exploit;

intercept traffic directed to and from the first resource group by configuring an interface microservice to operate in-line for the first resource group while not intercepting traffic directed to a non-impacted resource group;

apply an exploit mitigation to at least a portion of the intercepted traffic with one or more of the plurality of security microservices; and determine that the security exploit has been resolved with the one or more of the plurality of security microservices.

14. The apparatus of claim 13, wherein identifying that there is a disparate impact to the resource group members of the identified resource group comprises identifying a first set of resource group members as impacted by a security exploit and a second set of resource group members as non-impacted by the security exploit with one or more of the plurality of security microservices.

15. The apparatus of claim 14, further comprising splitting the identified resource group into the impacted resource group and the non-impacted resource group with one or more of the plurality of security microservices by:

generating a first data structure for the first set of resource group members and a second data structure for the second set of resource group members;

moving first metadata for the first set of resource group members to the first data structure;

moving second metadata for the second set of resource group members to the second data structure; and associating the first data structure and the second data structure.

16. The apparatus of claim 14, further comprising splitting the identified resource group into the impacted resource group and the non-impacted resource group with one or more of the plurality of security microservices by:

generating a first data structure for the first set of resource group members;

moving metadata for the first set of resource group members to the first data structure; and associating the first data structure with the identified resource group.

17. The apparatus of claim 14 further comprises combining the impacted resource group and the non-impacted resource group into a single resource group in response to determining if the security exploit has been resolved with one or more of the plurality of security microservices.

18. The apparatus of claim 14, wherein determining if the security exploit has been resolved with one or more of the plurality of security microservices comprises determining that the first set of resource group members are updated to a same version of an application as the second set of resource group members.

* * * * *